United States Patent [19]

Kawasumi

[11] 4,260,915

[45] Apr. 7, 1981

[54] PERMANENT MAGNET STEP MOTOR WITH A SHIFTABLE ROTOR

[75] Inventor: Kazuo Kawasumi, Suwa, Japan

[73] Assignee: Kabushiki Kaisha Suwa Seikosha, Tokyo, Japan

[21] Appl. No.: 58,963

[22] Filed: Jul. 20, 1979

Related U.S. Application Data

[63] Continuation of Ser. No. 837,075, Sep. 28, 1977, abandoned.

[30] Foreign Application Priority Data

Sep. 28, 1976 [JP] Japan ................................ 51/130045

[51] Int. Cl.³ ............................................ H02K 37/00
[52] U.S. Cl. .................................... 310/49 R; 308/10;
310/90; 310/156; 310/157; 310/191; 310/254
[58] Field of Search ............... 310/49 R, 77, 90, 156, 310/157, 191, 209, 254, 260, 264, 265; 308/10

[56] References Cited

U.S. PATENT DOCUMENTS

| | | | |
|---|---|---|---|
| 3,539,845 | 11/1970 | Stcherbatcheff | 310/156 X |
| 3,873,865 | 3/1975 | Preiser et al. | 310/90 |
| 4,079,274 | 3/1978 | Richmond | 310/156 X |
| 4,126,796 | 11/1978 | Ito | 310/156 X |

Primary Examiner—Mark O. Budd
Attorney, Agent, or Firm—Blum, Kaplan, Friedman, Silberman & Beran

[57] ABSTRACT

A step motor for an electronic wristwatch is provided wherein the load on the rotor is reduced. The reduction in the load on the rotor is provided by the configuration of a rotor pinion supporting the rotor and the manner in which same is supported by the rotor support assembly. The rotor pinion includes first and second trunions respectively disposed in first and second bearings. The rotor pinion includes first and second shoulders axially recessed from the ends of the trunions by a predetermined distance so as to define a clearance between the respective shoulders and the respective bearings for each rotary position of the rotor.

4 Claims, 4 Drawing Figures

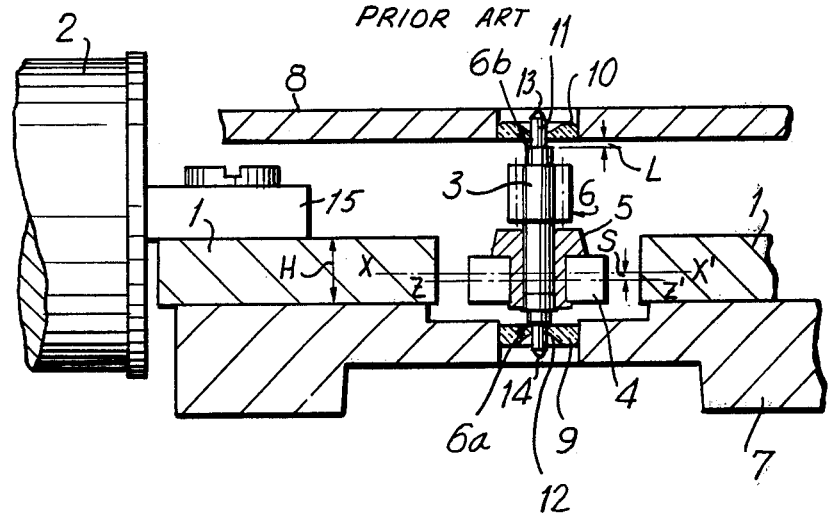
FIG. IA
PRIOR ART
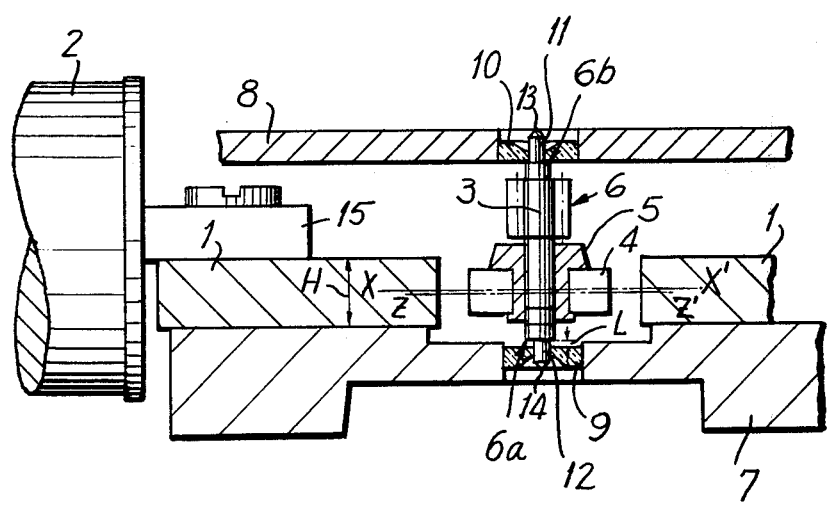
FIG. IB
PRIOR ART

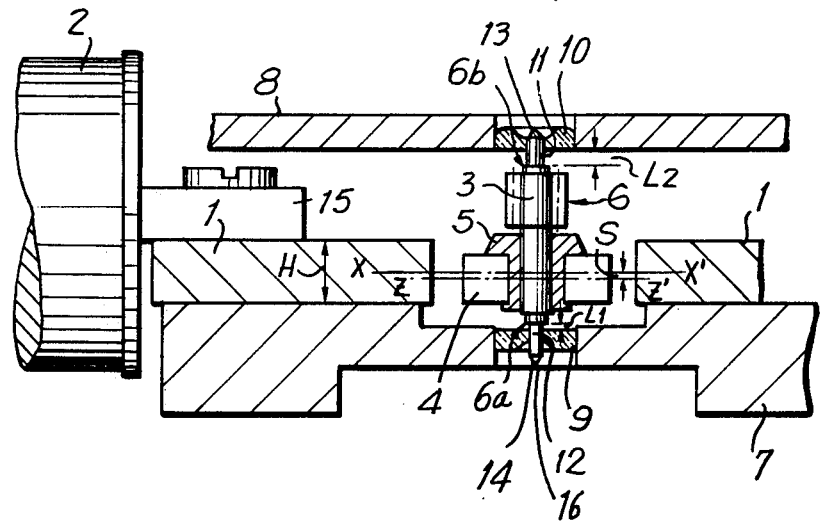
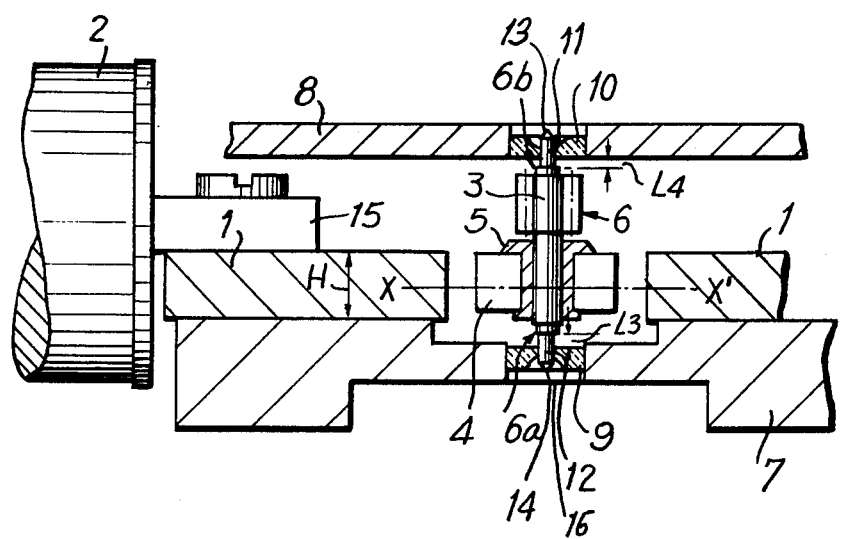

PERMANENT MAGNET STEP MOTOR WITH A SHIFTABLE ROTOR

This is a continuation, of application Ser. No. 837,075, filed Sept. 28, 1977 now abandoned.

BACKGROUND OF THE INVENTION

This invention is directed to a step motor for use in a quartz crystal electronic wristwatch, and, in particular, to an improved rotor support assembly for reducing the load on the rotor when same is incrementally rotated through each rotary position and thereby increasing the driving torque of the rotor.

In samll-sized electronic wristwatched utilizing a quartz crystal vibrator as a time standard and a step motor for driving the clock hands, the driving torque of the rotor is usually lower than the driving torque of a step motor utilized in a mechanical wristwatch. This reduction in driving torque is often a result of the differences in size between the component parts of the electronic wristwatch and mechanical wristwatch, and the limitations placed on the electronic wristwatch movement by the capacity of the battery. Efforts have been made to reduce the loading on the rotor provided by the gear train driven by the rotor, in order to more efficiently utilize the driving torque of the rotor. Nevertheless, it is often the loading on the rotor, provided by the step motor mechanism, that diminishes the driving torque of the rotor. Accordingly, a step motor for use in an electronic wristwatch wherein the rotor support assembly substantially reduces the load on the rotor, to thereby increase the effect of the driving torque of the rotor on the gear train of the wristwatch, is desired.

SUMMARY OF THE INVENTION

Generally speaking, in accordance with the instant invention, a step motor for an electronic timepiece having a rotor support assembly configured to reduce the load on the rotor for each rotary advancement thereof is provided. A stator surrounds the rotor and defines a flux field therebetween for incrementally rotating the rotor. The rotor support assembly is particularly characterized by first and second bearings and a rotor pinion supporting the rotor. The rotor pinion includes first and second trunions, respectively disposed in the first and second bearings. The rotor pinion further includes first and second shoulders, axially recessed from the ends of the first and second trunions by a predetermined distance so as to define a clearance between the respective shoulders and the respective bearings supporting the trunions for each rotary position of the rotor.

Accordingly, it is an object of the instant invention to provide an improved step motor for an electronic wristwatch.

A further object of the instant invention is to provide an improved rotor support assembly for a step motor to be utilized in an electronic wristwatch that reduces the loading on the rotor when same is incrementally advanced through each rotary position thereof.

Still a further object of the instant invention is to provide a step motor for use in a quartz crystal electronic wristwatch wherein the driving torque of the step motor is increased.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIGS. 1A and 1B are sectional views, taken in elevation, of a step motor assembly in an electronic wristwatch, constructed in accordance with the prior art; and FIGS. 2A and 2B are sectional views, taken in elevation, of a step motor assembly in an electronic wristwatch, constructed in accordance with a preferred embodiment of the instant invention.

DETAILED DESCRIPTION OF THE PREFERRED EMBODIMENTS

Turning now to FIGS. 1A and 1B, a step motor assembly disposed in an electronic wristwatch, constructed in accordance with the prior art, is respectively depicted as being positioned in a rest mode and in a stepping mode. Specifically, a lower support bridge 7 and upper support bridge 8, which bridges respectively support bearings 9 and 10 therein, are provided. Bearings 9 and 10 rotatably support the trunions 12 and 11 of a rotor pinion 6. Secured to rotor pinion 6 is a diametrically oppositely poled permanent magnet rotor 4, which rotor is secured to the rotor pinion 6 by a support collar 5. A magnetic permeable stator plate 1 is disposed around magnetic rotor 4, with a clearance therebetween, and is positioned with respect thereto by support bridge 7. The stator plate 1 is illustrated as being coupled through a conductive connecting plate 15 to a drive coil 2 to define an electrical connection between a first pole of the stator plate 1 and the drive coil.

The step motor assembly is operated in a conventional manner, whereby portions of the stator plate, diametrically opposed with respect to each other, are referenced to a first polarity with respect to each other and to the magnetic rotor 4 when the step motor is in a rest mode. Stepping, or incremental advancing, of the rotor is affected when the drive coil 2 applies a drive pulse to the stator plate 1. In response to the drive pulse, the diametrically opposed portions of the stator plate are reversed in polarity, thereby causing the portions of the stator plate, facing the portions of the magnetic rotor, to be of the same polarity, and thus effecting a rotational stepping of the rotor to a position wherein the portion of the stator, opposing the rotor, will be of an opposite polarity with respect thereto. Accordingly, by intermittently applying pulses to the stator plate 1, the rotor is incrementally advanced in a conventional manner.

FIG. 1A illustrates a step motor disposed in a rest condition, wherein the rotor is maintained in a rest position. The position of the rotor, in the axial direction, is determined by the weight of the rotor and the slight magnetic attraction between same and the stator plate. Accordingly, as illustrated in FIG. 1A, a slight magnetic attraction exists between the rotor and the stator plate, but the weight of the rotor causes the shoulder 6a of the rotor pinion 6 to rest against the bearing 9. Moreover, the weight of the rotor causes same to be off-centered in the axial direction with respect to the stator plate. Specifically, an imaginary plane perpendicular to the axis of the rotor pinion 6, defined by the letters Z—Z' in FIG. 1A, taken through the center of the rotor, is displaced by an offset distance S from an imaginary plane, defined by the letters X—X', perpendicular to the axis of the rotor pinion taken through the center of the stator plate, measured in the thickness direction H of the stator plate. Moreover, as illustrated in FIG. 1A, when the rotor is in a rest position, a gap L is formed between the upper shoulder 6b and the upper bearing 10.

By comparison, when the rotor is being incrementally stepped or rotated, in the manner indicated in FIG. 1B, the signal applied to the stator plate to effect a reversal of the polarity thereof, causes the rotor to be lifted as a result of the magnetic attraction between the stator plate and the magnetic rotor 4. The lifting of the rotor thereby causes the upper shoulder 6b of the rotor pinion 6 to be lifted into engagement with the bearing 10, and thereby define a gap L between the lower bearing 9 and the shoulder 6a of the rotor pinion. Also, as illustrated in FIG. 1B, the imaginary center plane, illustrated by Z—Z' through the magnetic rotor 4, is brought closer to the imaginary center plane X—X' in the stator plate, as a result of the magnetic attraction between the magnetic rotor and the stator during the advancement mode, which force is many times greater than the attractive magnetic forces between the stator plate and magnetic rotor when the rotor is in a rest position.

Accordingly, when the rotor is incrementally advanced or rotated, the shoulder 6b of the rotor pinion is brought into contact with the bearing 10, and thereby causes a frictional engagement therebetween. The frictional engagement therebetween loads down the rotor by as much as 2 g.cm, the exact amount of loading being based on the surface finishes of the bearing 10 and the type of lubricant utilized, thereby substantially reducing the driving torque of the rotor by providing an unnecessary loading thereon.

It is noted that the gap between the rotor and stator, in a step motor of the type conventionally utilized in an electronic wristwatch, is usually within the range of 1/100 to 5/100 mm, and the difference in thickness between the rotor magnet 4 and stator plate 1 is usually within a range of 5/100 to 20/100 mm. It is therefore noted that when the rotor magnet is shifted in the axial direction with respect to the stator plate, the respective shoulder portions 6a and 6b of the rotor pinion contact the bearings 9 and 10 because of the relationship (L<S) between the gap provided between the shoulder of the rotor pinion and the bearing and the axial offset S defined between the axial center of the rotor and the axial center of the stator plate.

Reference is now made to FIGS. 2A and 2B, wherein a step motor assembly, constructed in accordance with the instant invention, is depicted, like reference numerals being utilized to denote like elements detailed above. In FIG. 2A, the rotor is illustrated in a rest position wherein the pointed end 14 of the lower trunion 12 of the rotor pinion 6 is supported on the surface 16 of the lower bearing 9, so that the axial offset between the rotor 4 and stator plate 1 is minimized when the magnetic attraction therebetween is considered. When the rotor is in a rest position, a gap $L_1$ is defined between the lower shoulder portion 6a and bearing 9, with a further gap $L_2$ being defined between the upper shoulder portion 6b and the upper bearing 10.

Turning now to FIG. 2B, the step motor assembly is illustrated in an advance mode, wherein the step motor is being incrementally advanced in the usual manner. As a result of the greater attractive force, utilized to step the rotor, the rotor is elevated to a position whereby the axial center thereof is in alignment with the axial center of the stator plate. As a result of the lifting of the rotor and, hence, rotor pinion supporting same, a gap $L_4$ between the upper shoulder 6b and the upper bearing 10, and a further gap $L_3$ between the lower shoulder 6a and lower bearing 9 is formed. Stated otherwise, the shoulder portion of the rotor pinion is disposed out of engagement with the bearings, so that the rotor is in effect floating with respect to bearings 9 and 10 and thereby eliminates any frictional effects and, hence, loading on the rotor when the rotor is incrementally rotated. The absence of any loading effects on the rotor results from the gap L ($L_1+L_2$, $L_3+L_4$) of the rotor being defined sufficiently large so as to take account of the axial offset of the rotor S, with the shoulder portion of the rotor pinion being offset with respect to the respective tips 12 and 13 of the trunions 11 and 12 in the axial direction in order to assure the floating condition detailed above. By forming the rotor support assembly, in the manner detailed above, the frictional contact during the rest position and during the advance position between the shoulder portions of the rotor pinion and the bearings is completely eliminated, thereby eliminating the usual loading effects caused thereby on the rotor. It is noted that the rotor support assembly, illustrated in FIGS. 2A and 2B, provide the same benefit when the timepiece is held upside down.

It is also noted that magnetic bearings have been utilized to effect a floating of the rotor assembly and, hence, reduce the loading thereof. Nevertheless, such magnetic bearings require the use of permanent magnets to define a repulsion force between the permanent magnet and the rotor magnet in order to effect a lifting of the rotor. It has been found that such bearings are not particularly suited for use in miniaturized modules such as those utilized in an electronic wristwatch. This is particularly the case since the small-size of the bearing does not provide a sufficient magnetic area so as to provide a large enough repulsion force to the rotor assembly.

Accordingly, by floating the rotor with respect to the stator assembly, the rotor support assembly of the instant invention reduces the loading on the rotor, and thereby increases the driving torque of the rotor applied to the gear train of the electronic wristwatch.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. In a step motor for an electronic timepiece including a permanent magnet rotor, rotor support means for rotatably supporting said rotor, a magnetically permeable stator means surrounding said rotor and a drive coil coupled to said stator means, said drive coil being adapted to intermittently have a current applied thereto, said stator means being adapted in the absence of a current applied thereto to permit said rotor to remain substantially stationary, said stator means being further adapted in response to said current being intermittently applied to said drive coil to define a flux field between said stator means and said rotor means for incrementally rotating said rotor, the improvement comprising said rotor and stator means surrounding said rotor being constructed and arranged to axially displace said rotor with respect to said stator means in response to the flux field therebetween effecting an incremental rotation of said rotor, said rotor support means including first and second bearing means, a rotor pinion supporting the rotor, said rotor pinion including first and second trunions disposed in said respective first and second bearing means, said turnions being dimensioned to permit said trunions to be freely axially displaced in said bearing means, said rotor being positioned in a first axially displaceable position in the absence of a current applied to said drive coil and said attractive flux field between said stator means and rotor axially displacing said rotor to a second axial position when said attractive flux field effects an incremental rotation thereof so that the axial position of said rotor is determined solely by the attractive flux field between said stator means and said rotor when said current is applied to said drive coil.

2. The step motor as claimed in claim 1, wherein said bearing means are radial bearing means and the length of said first and second trunion is determined so that the rotor pinion is maintained out of interference with said radial bearing in the absence of a current being applied to said drive coil and is also disposed out of interference with said bearing means when said flux field between said rotor and stator means effects an incremental rotation of said rotor in response to a current being applied to said drive coil.

3. The step motor as claimed in claim 1, wherein a base plate is provided for supporting said first and second radial bearing means.

4. A step motor for an electronic timepiece comprising a permanent magnet rotor, rotor support means for rotatably supporting said rotor and including first and second radial bearing means, a rotor pinion supporting the rotor and including first and second trunions rotatably disposed in said radial bearing means, said trunions having an axial clearance between said respective radial bearing means so as to take account of the axial offset of said rotor and to reduce the loading on said rotor, a magnetic permeable stator means surrounding said rotor and a drive coil coupled to said stator means, said drive coil being adapted to intermittently have a current applied thereto, said stator means being adapted in the absence of a current applied thereto to permit said rotor to remain substantially stationary, said stator means being further adapted in response to said current being intermittently applied to said drive coil to define the flux field between said stator means and said rotor means for incrementally rotating said rotor, the axial position of said rotor being determined solely by said flux field between said stator means and said rotor means when said current is applied to said drive coil thereby effecting a floating of said rotor assembly.

* * * * *